(12) United States Patent
Hiemstra et al.

(10) Patent No.: US 12,093,088 B2
(45) Date of Patent: Sep. 17, 2024

(54) MODULAR LIGHT ASSEMBLY FOR A WEARABLE DEVICE

(71) Applicant: Apple Inc., Cupertino, CA (US)

(72) Inventors: Daniel J. Hiemstra, San Francisco, CA (US); Christopher D. Guichet, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/833,784

(22) Filed: Jun. 6, 2022

(65) Prior Publication Data

US 2023/0393635 A1 Dec. 7, 2023

(51) Int. Cl.
*G06F 1/16* (2006.01)
*G06F 1/18* (2006.01)

(52) U.S. Cl.
CPC ............ *G06F 1/1683* (2013.01); *G06F 1/163* (2013.01); *G06F 1/1698* (2013.01); *G06F 1/189* (2013.01)

(58) Field of Classification Search
CPC ...... G06F 1/163; G06F 1/1683; G06F 1/1698; G06F 1/189
USPC .................................................... 361/679.03
See application file for complete search history.

(56) References Cited

U.S. PATENT DOCUMENTS

| | | | | |
|---|---|---|---|---|
| 1,015,715 A | * | 1/1912 | Schindler | F21L 4/00 |
| | | | | 116/35 R |
| 1,217,666 A | * | 2/1917 | Thulin | F21V 21/34 |
| | | | | 224/907 |
| 1,769,241 A | * | 7/1930 | Stephani | F21V 21/0816 |
| | | | | 362/396 |
| 3,078,364 A | * | 2/1963 | Neugebauer | F21L 2/00 |
| | | | | 362/802 |
| 3,638,011 A | * | 1/1972 | Bain | A41D 19/0157 |
| | | | | 473/202 |

(Continued)

FOREIGN PATENT DOCUMENTS

CN 102122127 A 7/2011
CN 201974653 U 9/2011

(Continued)

OTHER PUBLICATIONS

E-smarter X3 LED Light Wrist Strap Watch Flashlight for Outdoor Cool Running, Product Description, retrieved from https://www.geekbuying.com/item/E-smarter-X3-LED-Light-Wrist-Strap-Watch-Flashlight-for-Outdoor-Cool-Running---Black-366104-366104.html, Jul. 2022, 20 pages.

(Continued)

*Primary Examiner* — Adrian S Wilson
(74) *Attorney, Agent, or Firm* — BAKERHOSTETLER (57) ABSTRACT

A modular light assembly is designed for integration with wearable devices. For example, the modular light assembly can connect with a wearable device, such as a smartwatch, including both a device housing and a band of the wearable device. Additionally, the modular light assembly can receive communication from the wearable device through various means, including inductive energy transfer. As a result, the modular light assembly can receive communication from the wearable device to activate (turn on) or deactivate (turn off) one or more light sources of the modular light assembly. Additionally, or alternatively, the modular light assembly device may include a button coupled to a switch that can activate or deactivate the light source(s).

20 Claims, 9 Drawing Sheets

(56) References Cited

U.S. PATENT DOCUMENTS

| | | | | |
|---|---|---|---|---|
| 4,417,819 A * | 11/1983 | Migeon | G04B 19/30 | 368/227 |
| 4,427,303 A * | 1/1984 | Matthias | H01R 12/675 | 368/282 |
| 4,625,339 A * | 12/1986 | Peters | A41D 19/0024 | 2/160 |
| 4,788,631 A * | 11/1988 | Fuller | F21V 21/0816 | 362/205 |
| 4,910,652 A * | 3/1990 | Rhine | G04G 21/00 | 368/227 |
| 4,972,394 A * | 11/1990 | DiMarco | G04B 47/02 | 368/227 |
| 5,001,462 A | 3/1991 | Seemann et al. | | |
| 5,154,506 A * | 10/1992 | Leard | F21V 21/0816 | 362/108 |
| 5,191,197 A * | 3/1993 | Metlitsky | G06Q 20/343 | 235/462.44 |
| 5,243,992 A * | 9/1993 | Eckerle | A61B 5/02438 | 600/503 |
| D340,778 S * | 10/1993 | Oberlander | D26/39 | |
| D344,411 S * | 2/1994 | Henry | D3/229 | |
| 5,309,328 A * | 5/1994 | Lum | A45F 5/00 | 224/267 |
| 5,345,368 A * | 9/1994 | Huff | F21V 21/0832 | 2/160 |
| 5,381,387 A * | 1/1995 | Blonder | H04B 1/385 | 379/433.06 |
| 5,448,458 A * | 9/1995 | Smyly, Jr. | F21L 4/00 | 362/570 |
| 5,548,565 A * | 8/1996 | Aoyama | G04B 47/00 | 368/227 |
| 5,889,737 A * | 3/1999 | Alameh | G04G 17/083 | 368/204 |
| 6,062,700 A * | 5/2000 | Price | A45F 5/00 | 362/205 |
| 6,192,253 B1 * | 2/2001 | Charlier | H04B 1/385 | 455/340 |
| 6,213,619 B1 * | 4/2001 | Yu | F21V 21/145 | 362/396 |
| 6,536,941 B1 * | 3/2003 | Fang | G04G 17/02 | 368/278 |
| 6,549,791 B1 * | 4/2003 | Jeon | H04B 1/385 | 379/433.08 |
| 6,550,930 B1 * | 4/2003 | Portouche | F21V 21/30 | 362/269 |
| 6,565,253 B1 * | 5/2003 | Yang | G04G 17/08 | 368/227 |
| 6,619,836 B1 * | 9/2003 | Silvant | G04G 17/08 | 368/282 |
| 7,023,763 B2 * | 4/2006 | Galli | G04B 19/30 | 368/227 |
| 7,123,550 B2 * | 10/2006 | Galli | G04B 19/30 | 368/227 |
| 7,568,263 B2 * | 8/2009 | Kim | G04G 17/02 | 368/282 |
| 7,618,260 B2 * | 11/2009 | Daniel | A44C 5/0007 | 439/528 |
| 7,819,544 B2 * | 10/2010 | Thompson | A41D 19/0157 | 362/103 |
| D649,272 S * | 11/2011 | Araujo | D26/39 | |
| 9,367,087 B1 * | 6/2016 | Townsend | G06F 1/1679 | |
| 9,471,102 B2 * | 10/2016 | Townsend | A44C 5/00 | |
| 9,700,087 B2 * | 7/2017 | Tiffin | A41D 19/01547 | |
| 9,760,115 B2 * | 9/2017 | Farjami | G06F 1/1635 | |
| 10,208,903 B2 | 2/2019 | Eivaz | | |
| 10,334,708 B2 * | 6/2019 | Kim | G06F 3/0312 | |
| 10,677,436 B2 * | 6/2020 | Schorr, III | F21V 23/0414 | |
| 2001/0043514 A1 * | 11/2001 | Kita | G06F 1/163 | 368/11 |
| 2002/0012292 A1 * | 1/2002 | Mitamura | A44C 5/0015 | 368/281 |
| 2003/0026170 A1 * | 2/2003 | Yang | G06F 1/163 | 368/278 |
| 2007/0064542 A1 * | 3/2007 | Fukushima | G04G 21/00 | 368/282 |
| 2007/0279852 A1 * | 12/2007 | Daniel | H04B 1/385 | 361/728 |
| 2013/0235546 A1 * | 9/2013 | Sedillo | G06F 1/163 | 361/809 |
| 2014/0218852 A1 * | 8/2014 | Alcazar | G06F 1/1635 | 361/679.03 |
| 2014/0295918 A1 * | 10/2014 | Grifoni | G06F 1/163 | 455/566 |
| 2015/0241912 A1 * | 8/2015 | Farjami | H05B 45/20 | 315/294 |
| 2016/0007430 A1 * | 1/2016 | Kidakarn | H05B 47/155 | 315/185 S |
| 2016/0086554 A1 * | 3/2016 | Suzuki | G09G 3/3406 | 345/102 |
| 2017/0163860 A1 * | 6/2017 | Frank | F16M 13/04 | |
| 2017/0357214 A1 * | 12/2017 | Choi | H01M 50/298 | |
| 2018/0020193 A1 * | 1/2018 | Blum | G03B 17/561 | |
| 2018/0220719 A1 * | 8/2018 | Chang | A44B 11/005 | |
| 2019/0014649 A1 * | 1/2019 | Kim | H05B 45/20 | |
| 2019/0216144 A1 * | 7/2019 | York | A41D 27/085 | |

FOREIGN PATENT DOCUMENTS

| | | |
|---|---|---|
| CN | 202176917 U | 3/2012 |
| GB | 2530484 B | 8/2016 |

OTHER PUBLICATIONS

Gearward Watch Flashlight, Product Description, retrieved from https://gearward.com/products/watch-flashlight, Jul. 2022, 5 pages.

* cited by examiner

MODULAR LIGHT ASSEMBLY FOR A WEARABLE DEVICE

TECHNICAL FIELD

This application is directed to an accessory device for a wearable device. More particularly, this application is directed to a modular light assembly that can integrate with a wearable device by securing with the wearable device and a band.

BACKGROUND

Wearable devices, including smartwatches, include a display that presents visual information (e.g., textual information, images) to a user. Additionally, some wearable devices can illuminate the display to provide a light source for a user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A wearable device, such as a smartwatch, can perform a range of functions that are managed by the components (e.g., sensor hardware, circuitry, and software) included with the wearable device. For example, a wearable device may include a display designed to present visual information to a user as well as receive an input from the user. Moreover, some displays of wearable devices can illuminate to simulate a light source, such as a flashlight. For example, one or more pixels of the display can illuminate in a white, or near-white, appearance.

The present disclosure is directed to accessory devices for wearable devices that provide an external light source separate from the display of the wearable device. Accessory devices described herein may include a modular light assembly designed to attach to the wearable device as well as a band (e.g., wristband) of the wearable device. Modular light assemblies described herein may include one or more discrete light sources that can be controlled (i.e., turned on or off) in a number of ways. For example, the accessory device, when attached to the wearable device, may be in communication with the wearable device such that an input to the wearable device can send a command to the accessory device to alter the state of the light sources. In other words, the input can change the state from an unilluminated (off) state to an illuminated (on) state, or vice versa. Additionally, an accessory device may include a button used to change the state of the light sources. By integrating a modular light source, wearable devices described herein may rely upon the light source mode, as opposed to a display of a wearable device, for illumination. Moreover, when the modular light sources includes a dedicated (i.e., separate) battery, the wearable device is less susceptible to the display draining the wearable device battery.

Also, wearable devices are commonly worn by a user during physical activity, including aerobic activity (e.g., jogging, running). Moreover, wearable devices are also commonly worn by a user while the user is swimming. Accordingly, the user may expose the wearable device to liquid. In this regard, modular light assemblies described herein may include liquid-resistant features, such as seals or O-rings, that prevent liquid ingress to sensitive components.

Systems, devices, and methods of the present disclosure can provide a modular light assembly that, when used with a wearable device, provides a dedicated illumination device. The modular light assembly can be controlled by a user through interaction with a feature located on the modular light assembly and/or through interaction with the display of the wearable device or other input mechanism of the wearable device.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
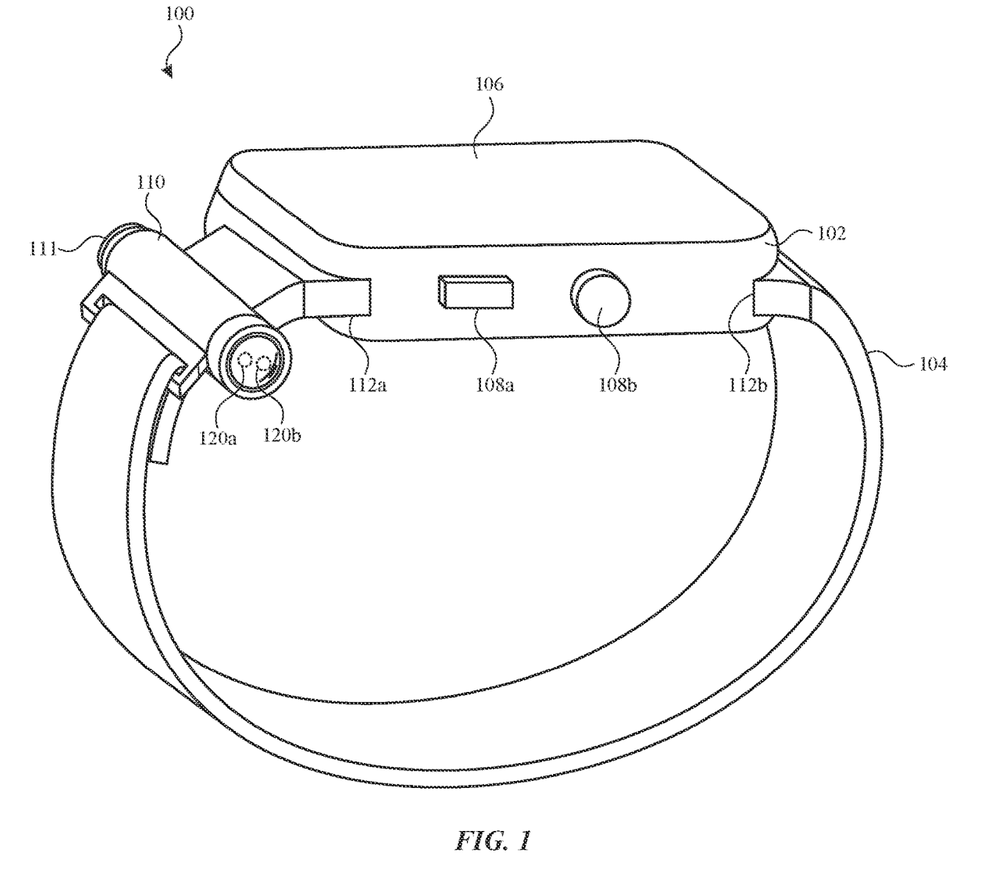
FIG. 1 illustrates a perspective view of a wearable device and an accessory device integrated with the wearable device, in accordance with some aspects of the present disclosure.

According to some embodiments, for example as shown in FIG. 1, a wearable device 100 includes an electronic device in the form of a smartwatch that is worn on an appendage (e.g., wrist) of a user. Wearable device 100 includes a device housing 102 that includes an internal chamber, or internal volume, that stores operational components, such as a processor, a memory circuit, sensors (e.g., heart rate sensor, blood-oxygen level sensor), and a battery, as non-limiting examples. Device housing 102 may include a metal housing or non-metal housing.

To secure with a user, wearable device 100 may include a band 104 that wraps around an appendage of a user. Band 104 may include one or more of a variety of materials, such as silicone, woven fabric, or multiple metal links.

Wearable device 100 further includes a display 106 designed to present visual information in the form of textual information, still images, or motion images (i.e., video). Display 106 may include a light-emitting diode (LED) display or an organic light-emitting diode (OLED) display, as non-limiting examples. Additionally, display 106 may include a capacitive touch input display, thus allowing display 106 to take the form of a touchscreen to receive an input from a user.

Additionally, wearable device 100 may include input mechanisms designed to provide an input to a processor of wearable device 100, with the input causing the processor to provide a command to alter and update the visual information provided by display 106. For example, wearable device 100 includes an input mechanism 108a and an input mechanism 108b. Input mechanism 108a may include a button that, when depressed, actuates a switch to generate an input. Input mechanism 108b may include a dial that, when rotated, generates an input. Moreover, the input may vary based upon clockwise rotation or counterclockwise rotation of input mechanism 108b. Additionally, input mechanism 108b can also take the form of a button that, when depressed, actuates an additional switch to generate an input.

As shown in FIG. 1, an accessory device 110 is secured with wearable device 100. In some embodiments, accessory device 110 takes the form of a modular light assembly that includes one or more light sources, such as a light source 120a and a light source 120b. In this regard, accessory device 110 provides an illumination device separate from display 106. The state (i.e., on or off states) of light sources 120a and 120b can be controlled/altered using a button 111 of accessory device 110. In some embodiments, an input to display 106 and/or input mechanisms 108a and 108b alters the state of light sources 120a and 120b.

To integrate with wearable device 100, accessory device 110 can secure with both device housing 102 and band 104. Further, as shown in FIG. 1, device housing 102 includes a receptacle 112a and a receptacle 112b. By way of an intermediate device (discussed below), accessory device 110 can secure with device housing 102 at receptacle 112a. Also, accessory device 110 can secure with band 104.

As shown in FIG. 1, band 104 forms a continuous loop in which one end of band secures with accessory device, and another opposite end secures with receptacle 112b. While band 104 is shown as being connected to accessory device 110 and receptacle 112b, band 104 can be disconnected with accessory device 110 and/or receptacle 112b, and replaced with one or more bands (not shown in FIG. 1). Accordingly, band 104 is detachably secured with accessory device 110 and receptacle 112b.

Based on the position of light sources 120a and 120b relative to display 106, light sources 120a and 120b, when illuminated, generate visible light cast in a direction that is perpendicular, or at least substantially perpendicular, to a plane defined by display 106 and perpendicular to a loop defined by band 104. Put another way, light sources 120a and 120b, when illuminated, generate visible light cast in a direction that is parallel, or at least substantially parallel, to an axis defined by a user's appendage (not shown) when the appendage passes through band 104.

To secure with device housing 102 (shown in FIG. 1), a connection mechanism 116b may serve as an intermediate device that is secured with housing assembly 114. Connection mechanisms 116a and 116b may be referred to as a first connection mechanism and a second connection mechanism, respectively. However, "first" and "second" may be used interchangeably. Connection mechanism 116b may act as a link, or linking element, between housing assembly 114 and device housing 102. In some embodiments, housing assembly 114 and connection mechanism 116b are integrally formed together, and thus non-separable.

Figure 2:
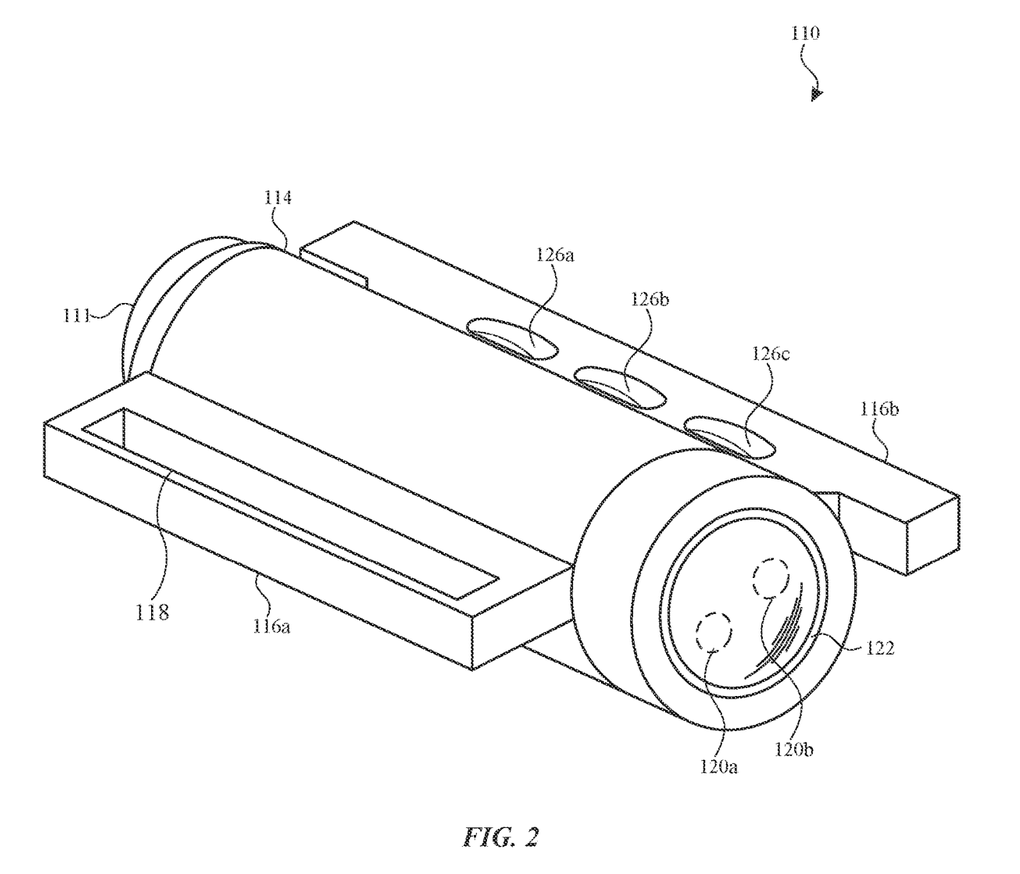
FIG. 2 illustrates perspective view of the accessory device shown in FIG. 1, in accordance with some aspects of the present disclosure.

Referring to FIG. 2, accessory device 110 is shown separated from wearable device 100 and band 104 (both shown in FIG. 1). Accessory device 110 includes a housing assembly 114 that includes an internal chamber, or internal volume, that carries several components for accessory device 110. As shown, housing assembly 114 includes a cylindrical body, or at least a substantially cylindrical body. However, other shapes are possible. Housing assembly 114 may be formed from one or more materials, such as aluminum (including anodized aluminum) as a non-limiting example. However, other materials (including different metals and non-metals) may also be used. Further, a connection mechanism 116a extends from housing assembly 114 and forms an opening 118 to receive a band (e.g., band 104 shown in FIG. 1). As shown in FIG. 2, connection mechanism 116a extends radially outward from housing assembly 114.

Band 104 may include a self-securing feature, such as hook and loop fasteners (i.e., VELCRO®), magnets, snaps (as non-limiting examples), used to secure with accessory device 110. Also, in this regard, band 104 is separable from accessory device 110 by disconnecting band 104 from connection mechanism 116a, i.e., removing band 104 from opening 118. By separating band 104 from connection mechanism 116a, band 104 is not deformed or otherwise damaged. Alternatively, in some embodiments, band 104 is sewn, adhered, or otherwise permanently attached to accessory device 110.

Light sources 120a and 120b of accessory device 110 may include LED light sources or incandescent light elements. Light sources 120a and 120b may provide visible light in a variety of colors, as well as white light. Moreover, the color/appearance and/or the intensity (e.g., lumens) of the visible light may be preset, or alternatively, may be adjusted by a user input. While two light sources are shown, accessory device 110 may include a different number of light sources. Accessory device 110 may also include a lens 122 that covers light sources 120a and 120b. Lens 122 may include a transparent material (e.g., glass or plastic), and act as a protective cover for light sources 120a and 120b.

In the embodiment shown in FIG. 2, housing assembly 114 and connection mechanism 116b are separable pieces secured together. Also, connection mechanism 116b is designed to detachably secure with device housing 102 such that connection mechanism 116b can be secured with or removed from a receptacle (i.e., receptacle 112a shown in FIG. 1) of device housing 102. Connection mechanism 116b carries multiple protruding elements designed to mate with device housing 102. For example, connection mechanism 116b includes a protruding element 126a, a protruding element 126b, and a protruding element 126c. Protruding elements 126a, 126b, and 126c may take the form of a non-metal insert and may include one or more non-metal materials (e.g., rubber, silicone) that increase the securing force between connection mechanism 116b and device housing 102, and also prevent damage (i.e., scratching) of device housing 102.

Figure 3:
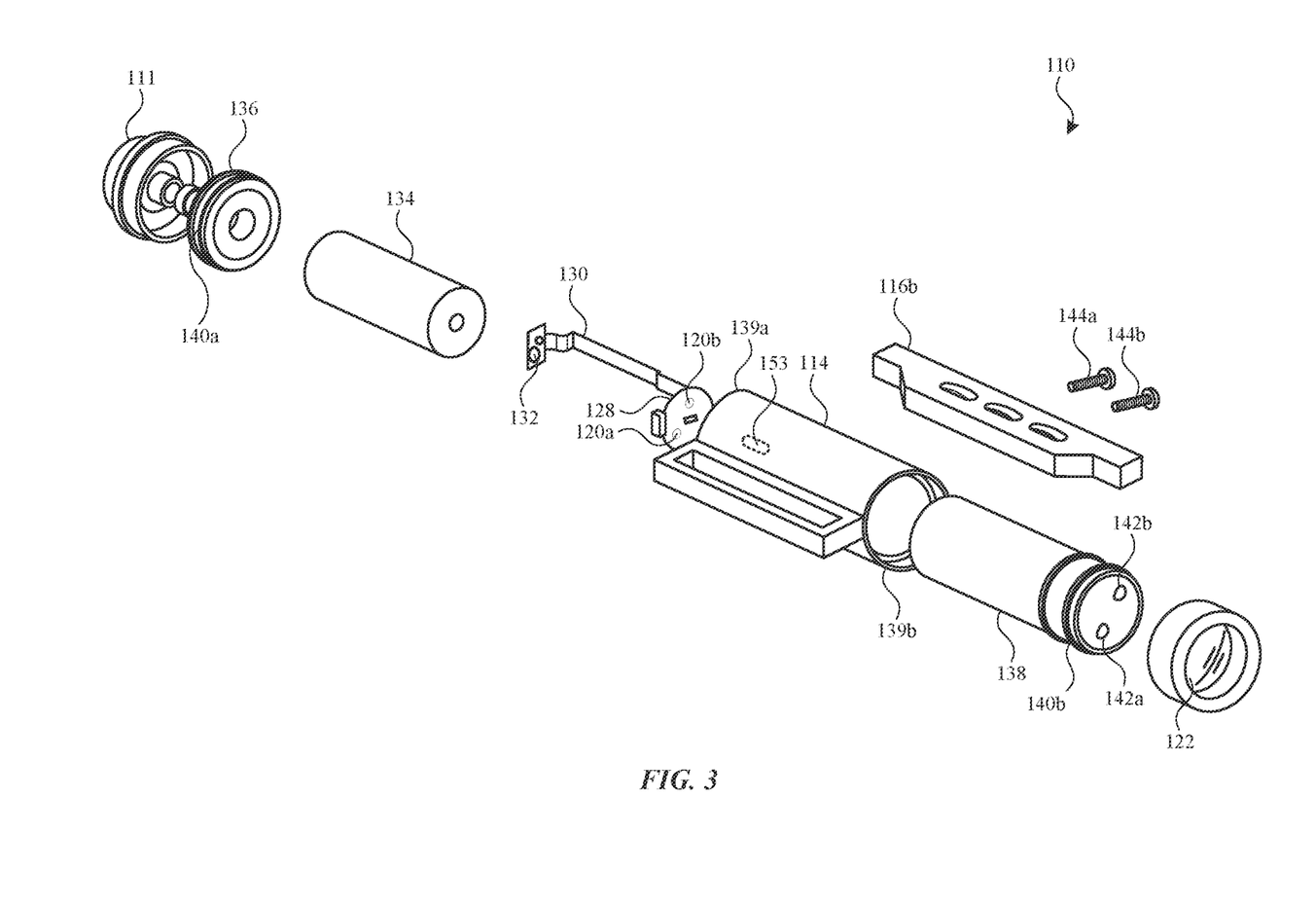
FIG. 3 illustrates an exploded view of the accessory device, showing several components of the accessory device, in accordance with some aspects of the present disclosure.

Referring to FIG. 3, accessory device 110 includes several additional components. For example, accessory device 110 includes a circuit board 128 that carries light sources 120a and 120b. Additionally, accessory device 110 includes a flexible circuit 130 and a switch 132 located on flexible circuit 130. Flexible circuit 130 is electrically coupled to light sources 120a and 120b via circuit board 128. Accessory device 110 further includes a power source 134. By depressing button 111, switch 132 is actuated, thus allowing light sources 120a and 120b to receive electrical current from power source 134 to energize (e.g., turn on) and illuminate light sources 120a and 120b. Button 111 can be sequentially depressed to actuate switch 132 and deenergize (e.g., turn off) turn off light sources 120a and 120b.

In some embodiments, power source 134 is a battery, which may include a rechargeable battery. In this regard, accessory device 110 may include a port (not shown in FIG. 3) used to receive an external power source that charges power source 134. Alternatively, power source 134 may be charged during a charging operation of wearable device 100 (shown in FIG. 1) when wearable device 100 is capable of transferring electrical current to accessory device 110.

Accessory device 110 further includes a sleeve 136 and a lens barrel 138 that secure with opposing ends of housing assembly 114. For example, sleeve 136 can secure button 111 with a first end 139a of housing assembly 114, while lens barrel 138 can secure lens 122 with a second end 139b of housing assembly 114. Additionally, lens barrel 138 can receive light sources 120a and 120b, circuit board 128, flexible circuit 130, switch 132 and power source 134. Lens barrel 138 may also be disposed in housing assembly 114. Further, in order to prevent liquid ingress into housing assembly 114, sleeve 136 and lens barrel 138 include a sealing element 140a and a sealing element 140b, respectively. In some embodiments, sealing elements 140a and 140b are O-rings. As a result of sealing elements 140a and 140b, accessory device 110 forms a liquid-resistant accessory device that protects sensitive components, such as light sources 120a and 120b and power source 134.

To further enhance light sources 120a and 120b, accessory device 110 may include a lens 142a and a lens 142b that cover light sources 120a and 120b, respectively. When accessory device 110 is assembled, lens 122 covers lenses 142a and 142b. Also, to secure connection mechanism 116b with housing assembly 114, accessory device 110 includes a fastener 144a and a fasteners 144b. In some embodiments, fasteners 144a and 144b are threaded fasteners. Based on fasteners 144a and 144b, connection mechanism 116b may be a removable connection mechanism, thus allowing a different connection mechanism (not shown in FIG. 3) to be secured with housing assembly 114.

Housing assembly 114 may include an opening 153 that receives flexible circuit 148 and is also covered by connection mechanism 116b when connection mechanism 116b is assembled to housing assembly 114.

In addition to button 111, the state of the light sources 120a and 120b can be altered through other means. Connection mechanism 116b can carry components used to communicate with electrical components of wearable device 100 (shown in FIG. 1). For example, referring to FIG. 4, a communication component 146 is designed to communicate with a corresponding communication component of wearable device 100 (shown in FIG. 1). In some embodiments, communication component 146 is an inductive coil. In this regard, communication component 146 includes a wire wrapped around multiple protruding features. An induced electrical current can form in communication component 146 when communication component 146 is in proximity to an alternating electromagnet field. The induced electrical current may correspond to a command to turn on or turn off light sources 120a and 120b. To carry the induced electrical current, a flexible circuit 148 is electrically coupled to communication component 146 and flexible circuit 130 (shown in FIG. 3).

Figure 4:
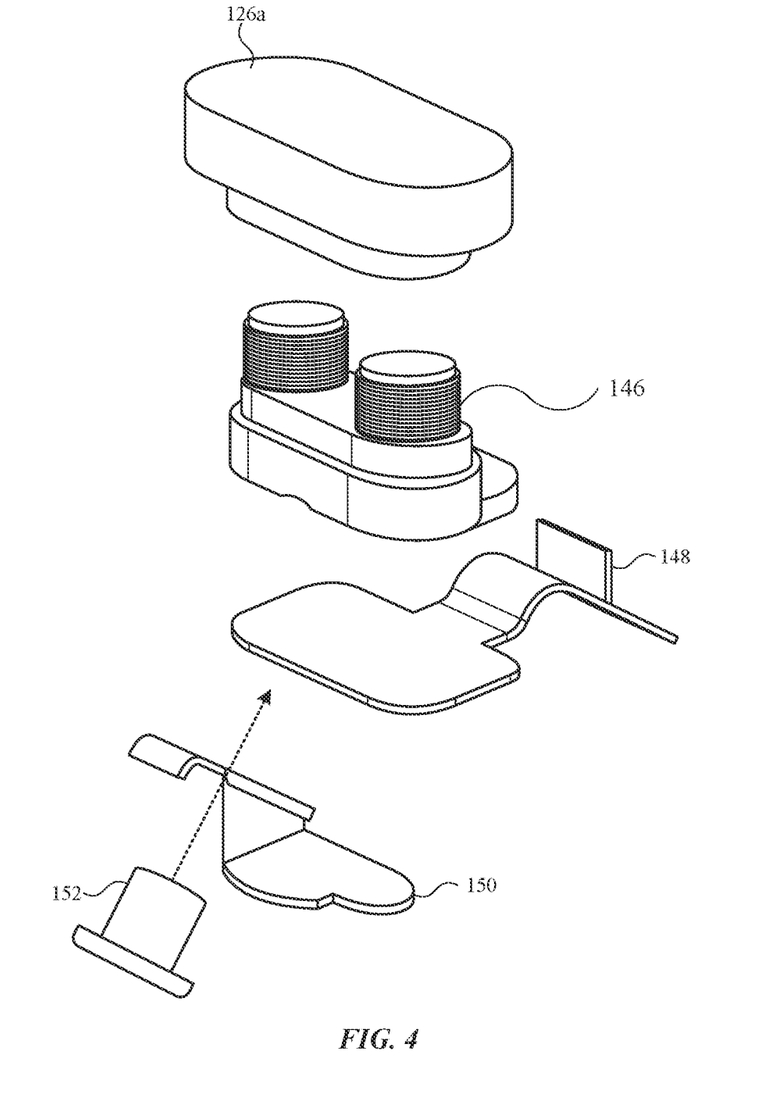
FIG. 4 illustrates an exploded view of a protruding element of the link, showing additional components, in accordance with some aspects of the present disclosure.

To store communication component 146, protruding element 126a can provide an internal storage area. By modifying and using protruding element 126a—an existing component of connection mechanism 116b—additional design modifications for storing accessory device 110 may not be required. Beneficially, connection mechanism 116b may include one or more metal components, yet not impede a magnetic field from reaching communication component 146, as protruding element 126a is a non-metal component. While protruding element 126a is shown as a component to receive communication component 146, either of protruding elements 126b and 126c (shown in FIG. 2) may alternatively be used. Additionally, a cowling 150 and a fastener 152 can secure communication component 146 and flexible circuit 148 with connection mechanism 116b.

Figure 5:
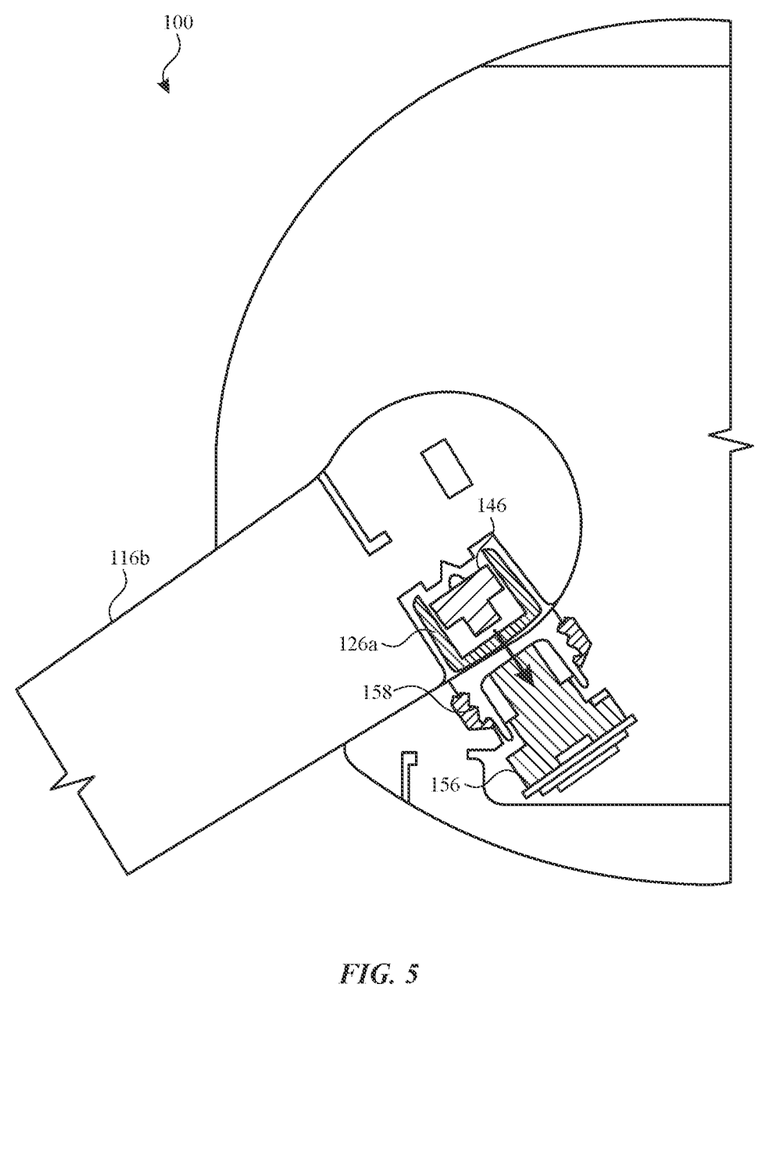
FIG. 5 illustrates a cross-sectional view of the wearable device and the accessory device, showing respective communication components of the wearable device and the accessory device, in accordance with some aspects of the present disclosure.

Referring to FIG. 5, wearable device 100 includes a communication component 156 designed to communicate with communication component 146 disposed in connection mechanism 116b. In some embodiments, communication component 156 is an inductive coil similar to communication component 146 when communication component 146 takes the form of an inductive coil. Further, in some embodiments, communication component 156 is a transmitter coil and communication component 146 is a receiver coil. Accordingly, when communication component 156 receives an alternating electrical current, an alternating electromagnetic field is generated. Based on the respective positions of communication components 146 and 156, the alternating electromagnetic field reaches communication component 146 and induces an electrical current in communication component 146. The induced electrical current is used as a command from wearable device 100 to alter a state of (i.e., activate or deactivate) light sources 120a and 120b of accessory device 110 (shown in FIG. 2). The use of communication components 146 and 156 allows wearable device 100 and accessory device 110 (shown in FIG. 1) to communicate without a direct, wired communication.

Alternatively, in some embodiments (not shown), a wired connection between communication components 146 and 156 is implemented. For example, pin-and-socket connections, spring loaded pins (e.g., pogo pins), and other wired connections that can be disconnected by a user can be implemented between wearable device 100 and accessory device 110.

As shown in FIG. 5, wearable device 100 includes a cap 158 that covers communication component 156. Cap 158 may include a non-metal material, such as plastic, silicone, rubber, or the like. Accordingly, based on their respective material makeups, protruding element 126a and cap 158 provide little, if any, impedance of the electromagnetic field, while also providing a protective cover against ingress of liquid, debris, or other contaminants.

Figure 6:
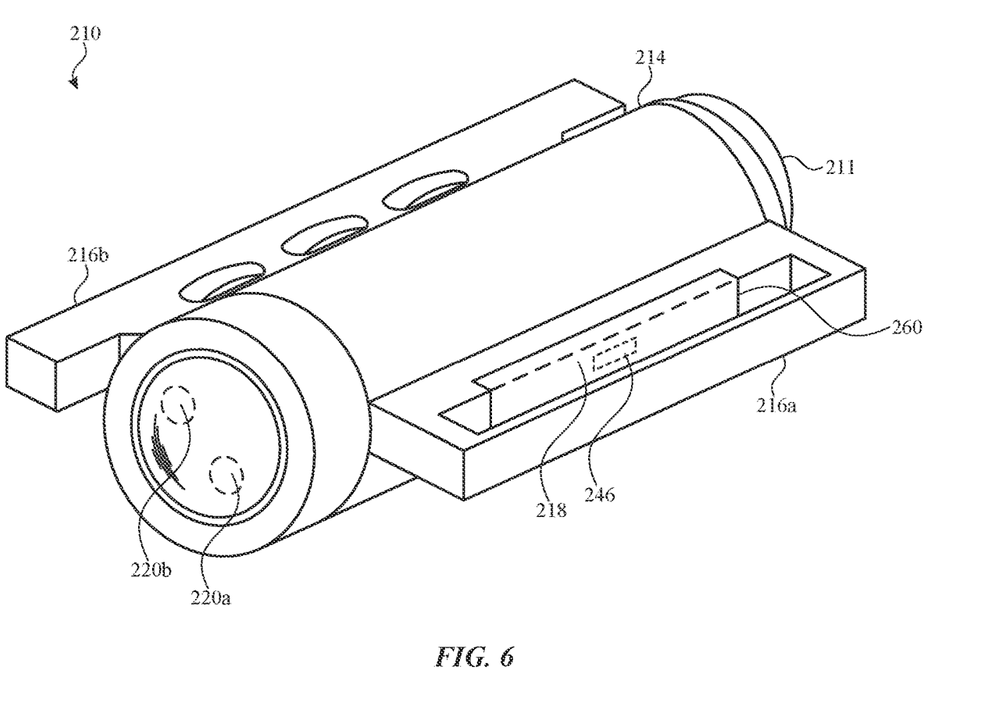
FIG. 6 illustrates a perspective view of an alternate embodiment of an accessory device, showing a modification to a housing assembly to enable an alternate communication mode, in accordance with some aspects of the present disclosure.
Figure 7:
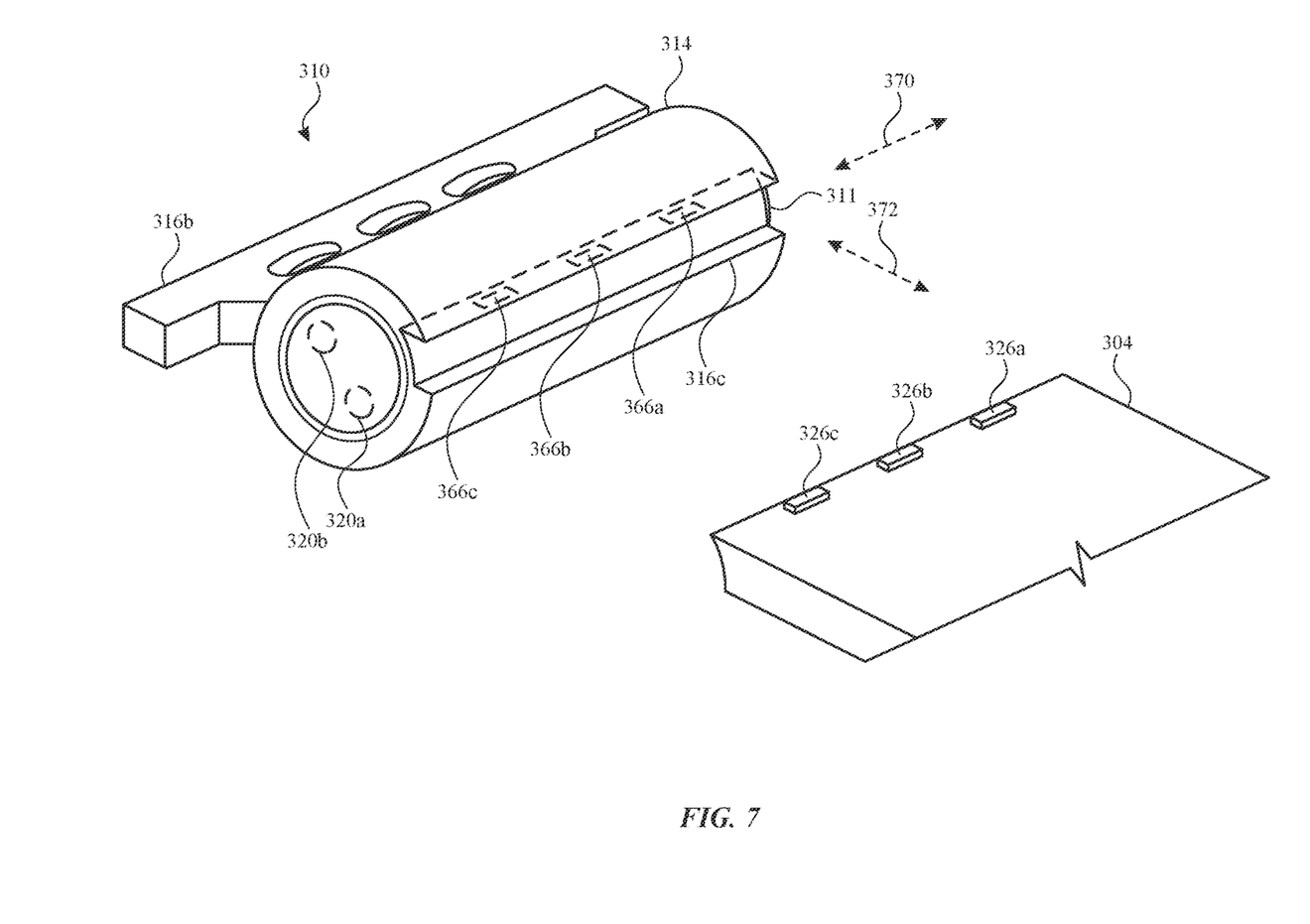
FIG. 7 illustrates a perspective view of an alternate embodiment of an accessory device, showing a modification to a housing assembly to secure with a band, in accordance with some aspects of the present disclosure.

Accessory devices described herein may include several modifications. For example, FIGS. 6 and 7 show and describe exemplary modifications to at least one prior embodiment of an accessory device. Although not shown and described in the same details as prior embodiments, accessory devices shown and described in FIGS. 6 and 7 may include any components and associated features shown and described for prior embodiments of an accessory device.

Referring to FIG. 6, an accessory device 210 may include a housing assembly 214 and light sources 220a and 220b carried by housing assembly 214. Similar to a prior embodiment, accessory device 210 includes a connection mechanism 216a and a connection mechanism 216b. Accessory device 210 further includes a button 211 used to control light sources 220a and 220b. However, other methods for controlling light sources 220a and 220b are possible. For example, as shown, a connection mechanism 216a extends from housing assembly 214 and forms an opening 218 to receive a band (e.g., band 104 shown in FIG. 1). Additionally, a non-metal structure 260 is integrated with housing assembly 214. Non-metal structure 260 may include one or more materials, such as a polymeric material, resin, or the like. Non-metal structure 260 is formed in proximity to connection mechanism 216a and opening 218. However, other locations of non-metal structure 260 are possible.

As shown in FIG. 6, non-metal structure 260 covers a communication component 246. In some embodiments, communication component 246 is a wireless transceiver that communicates with a wearable device (not shown in FIG. 6) over a short-range communication protocol, such as BLUETOOTH® (as a non-limiting example), using an antenna circuit and controller. In this regard, non-metal structure 260 is selected so as to provide little, if any, impedance of radio frequency (RF) communication. Beneficially, housing assembly 214 may include one or more metals to provide a robust housing, while also permitting wireless communication, as non-metal structure 260 allows communication component 246 to send and receive RF energy, which can be used to control (i.e., turn on and turn off light sources 220a and 220b).

Referring to FIG. 7, an accessory device 310 may include a housing assembly 314 and light sources 320a and 320b carried by housing assembly 214. Similar to a prior embodiment, accessory device 310 includes a connection mechanism 316b. Accessory device 310 further includes a button 311 used to control light sources 320a and 320b. However, other methods for controlling light sources 320a and 320b are possible, such as through inducing electrical current or short-range wireless communication protocol. As shown, housing assembly 314 includes a connection mechanism 316c designed to receive a structure. Rather than protrude from housing assembly 314 (similar to connection mechanisms 116a and 216a in FIGS. 2 and 6, respectively), connection mechanism 316c forms a receptacle, or recessed area, in housing assembly 314. In this regard, connection mechanism 316c is capable of receiving and securing a band 304. Accordingly, connection mechanism 316c can replace a loop and opening shown in prior embodiments. As shown, connection mechanism 316c includes receptacles 366a, 366b, and 366c designed to receive protruding elements 326a, 326b, and 326c, respectively, of band 304.

Also, as shown in FIG. 7, connection mechanism 316c extends to opposing ends of housing assembly 314, thereby allowing band 304 to slide axially into and out of connection mechanism 316c in the directions along arrows 370. The size and shape of housing assembly 314 may be altered such that button 311 does not interfere with band 304 entering or exiting connection mechanism 316c. Alternatively, band 304 may slide radially into and out of connection mechanism 316c in the directions along arrows 372. Regardless of the securing direction, band 304 can detachably secure with housing assembly 314 of accessory device 310 by way of connection mechanism 316c. Although not shown, band 304 may include a second, opposing end that detachably secures with a receptacle (e.g., receptacle 112b shown in FIG. 1) of a housing assembly of a wearable device. Alternatively, band 304 may secure through mechanical means, magnetic elements, and/or hook and look fasteners, with an additional band (not shown in FIG. 7), and the additional band is configured to detachably secure with a receptacle (e.g., receptacle 112b shown in FIG. 1) of a housing assembly of a wearable device.

Figure 8:
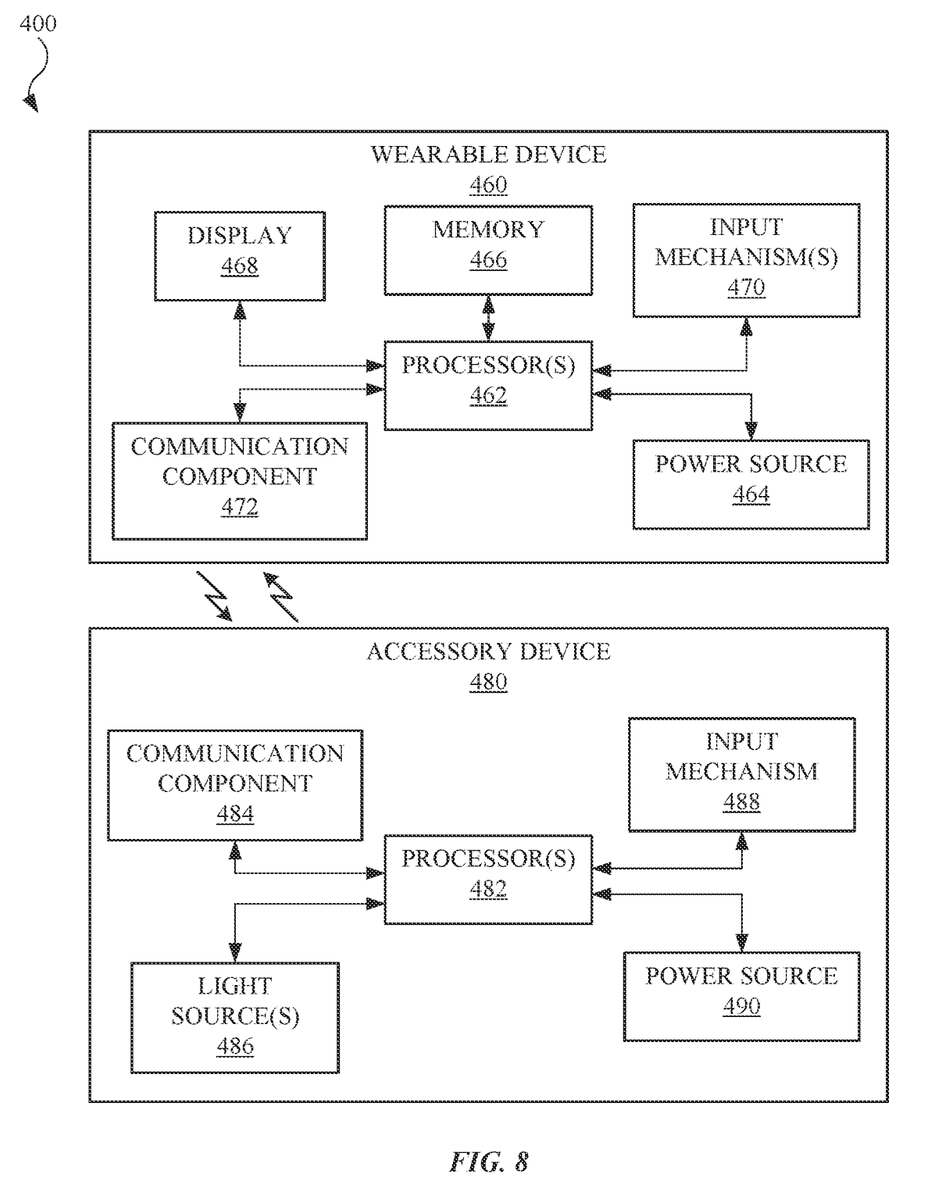
FIG. 8 illustrates a schematic diagram of the wearable device and the accessory device, in accordance with some aspects of the present disclosure.

FIG. 8 illustrates a schematic diagram 400 of a wearable device 460 and an accessory device 480, in accordance with some aspects of the present disclosure. The components and associated features of wearable device 460 and accessory device 480 may be incorporated into any wearable device and accessory device, respectively, described herein.

As shown, wearable device 460 includes one or more processors 462. One or more processors may include a central processing unit (CPU), a graphics processing unit (GPU), a controller (including one or more microcontrollers), and an application specific integrated circuit (ASIC), as non-limiting examples.

Wearable device 460 further includes a power source 464 electrically coupled to one or more processors 462. Power source 464 may include a direct current (DC) battery, including a DC rechargeable battery. Power source 464 is designed to provide electrical energy to the various components of wearable device 460 shown in FIG. 8.

Wearable device 460 further includes a memory 466, which may include random-access memory (RAM) and read-only memory (ROM), as non-limiting examples. Memory 466 stores various software applications, including their respective executable instructions that are run by one or more processors 462. For example, memory 466 stores a software application for operating accessory device 480, including one or more light sources 486 of accessory device 480.

Wearable device 460 further includes a display 468 in communication with one or more processors 462. Display 468 is designed to present visual information based on, for example, information provided by software applications stored on memory 466. Based on at least one software application stored on memory 466, display 468 can present visual information that includes an indication whether one or more light sources 486 of accessory device 480 is turned on or off, as well as the light intensity (e.g., brightness) of one or more light sources 486. Additionally, display 468 may include a capacitive touch input display. In this regard, a touch input to display 468 can provide a signal to one or more processors 462, which can be used by one or more processors 462 to generate a command to turn on or turn off one or more light sources 486 of accessory device 480. Additionally, or in combination, a swipe or gesture to display 468 can provide a signal to one or more processors 462, which can be used by one or more processors 462 to generate a command to increase the intensity (i.e., brighten) or decrease the light intensity (i.e., dim) of one or more light sources 486 of accessory device 480.

Wearable device 460 further includes one or more input mechanisms 470 in communication with one or more processors 462. One or more input mechanisms 470 may include a button designed to, when depressed, actuate a switch. In this regard, one or more input mechanisms 470 can provide a signal to one or more processors 462, which can be used by one or more processors 462 to generate a command to turn on or turn off one or more light sources 486 of accessory device 480. Additionally, or in combination, one or more input mechanisms 470 may include a dial designed to, when rotated, provide a signal to one or more processors 462, which can be used by one or more processors 462 to generate a command to increase or decrease the light intensity of one or more light sources 486 of accessory device 480.

Wearable device 460 further includes a communication component 472 in communication with one or more processors 462. Communication component 472 is designed to communicate a command from one or more processors 462 to a communication component 484 of accessory device 480. In some embodiments, communication components 472 and 484 each include an inductive coil. In this regard, when one or more processors 462 receives an input from display 468 or from one or more input mechanisms 470, one or more processors 462 allows communication component 472 to receive electrical current from power source 464. Moreover, one or more processors 462 can modify the electrical current from power source 464 such that communication component 472 receives an alternating electrical current. Based on the alternating electrical current, an alternating electromagnetic field is emitted from communication component 472, causing an induced electrical current in communication component 484 of accessory device 480. The induced electrical current represents a transmission of the command by wearable device 460 to one or more processors 482 to operate one or more light sources 486 of accessory device 480 in accordance with the command, i.e., turn on, turn off, increase light intensity of, or decrease light intensity of one or more light sources 486.

In some embodiments, communication component 472 of wearable device 460 may induce electrical current in a series of pulses, with the pulses varying in terms of the number of pulses, time between consecutive pulses, and/or duration of pulses. In this regard, each series of pulses is assigned to a particular command that is known by both one or more processors 462 of wearable device 460 and one or more processors 482 of accessory device 480. Accordingly, one or more processors 482 of accessory device 480 can decode the series of pulses to determine the type of command.

Alternatively, in some embodiments, communication components 472 and 484 each include a wireless transceiver designed to communicate over a short-range wireless protocol, such as BLUETOOTH® as a non-limiting example. The communication may include a command code provided by the communication component 472 of the wearable device 460 to communication component 484 of accessory device 480. The command code may include an instruction to turn on or turn off one or more light sources 486, or to increase or decrease the light intensity of one or more light sources 486.

Accessory device 480 includes one or more processors 482. One or more processors may include a CPU or an ASIC, as non-limiting examples. One or more processors 482 can receive an input from communication component 484, with the input including an electrical signal representing a command to instruct one or more processors 482 to control (i.e., turn on, turn off, increase the light intensity of, or decrease the light intensity of) one or more light sources 486 in communication with one or more processors 482.

Each of one or more light sources 486 may include an LED or an incandescent bulb. Moreover, when one or more light sources 486 are capable of illuminating in different colors of visible light, a command received by one or more processors 482 via communication component 484 can instruct one or more light sources 486 to change color.

As yet another way in which one or more light sources 486 can be controlled, a command provided by wearable device 460 may be used to command a subset of one or more light sources 486 to turn on, or to command a subset of one or more light sources 486 to turn off. Accordingly, a collective light intensity of one or more light sources 486 can altered based on turning some, but not all, light sources of one or more light sources 486 on or off.

Additionally, accessory device 480 includes an input mechanism 488 in communication with one or more processors 482. In some embodiments, input mechanism 488 includes a button that, when depressed, actuates a switch and generates an electrical signal to one or more processors 482. One or more processors 482 uses the electrical signal to generate an instruction to one or more light sources 486 that turns on or turns off one or more light sources 486. Moreover, in some embodiments, a series of depressions to input mechanism 488 may generate a corresponding series of electrical signals received by one or more processors 482. One or more processors 482 can use the series of electrical signal to generate an instruction to one or more light sources 486 that turns on, turns off, increases the lights intensity, decreases the light intensity, or turns on/off a subset of one or more light sources 486.

Further, accessory device 480 includes a power source 490 in communication with one or more processors 482. Power source 490 may include a DC battery, including a DC rechargeable battery. Power source 490 is designed to provide electrical energy to the aforementioned components of accessory device 480. In some embodiments, communication component 472 induces an electrical current in communication component 484, and the electrical current is used to charge power source 490. Also, in some embodiments, communication component 472 induces an electrical current in communication component 484, and the electrical current is used to operate components (i.e., one or more processors 482, communication component 484, and one or more light sources 486), and power source 490 is not present in accessory device 480.

Additionally, in some embodiments, wearable device 460 can request information from accessory device 480 and accessory device 480 can provide the information based on the request. For example, communication component 484 can provide information, such as which, if any, of one or more light sources 486 are illuminated, the intensity (e.g., degree of brightness as a percentage) of each of the one or more light sources 486, and/or battery life of power source 490. The information provided by communication component 484 can be received by wearable device 460, and one or more processors 462 of wearable device 460 can execute instructions stored on memory 466 to illuminate display 468 and present visual information in accordance with the received information. Additionally, in some embodiments, accessory device 480 can provide the information to wearable device 460 without a request from wearable device 460.

Figure 9:
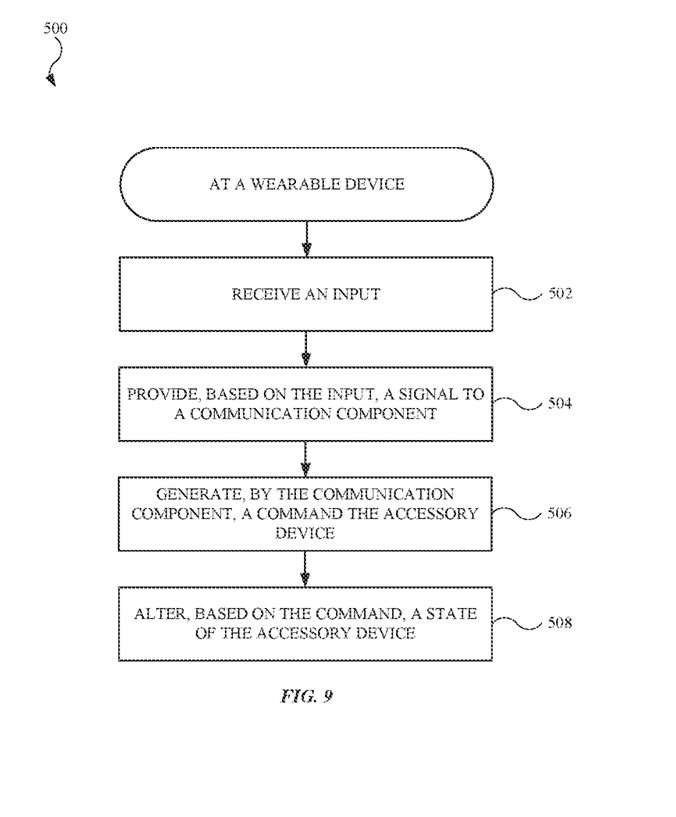
FIG. 9 illustrates a flowchart showing a method for operating an accessory device, in accordance with some aspects of the present disclosure.

FIG. 9 illustrates a flowchart 500 showing a method for operating an accessory device, in accordance with some aspects of the present disclosure. The steps shown and described in flowchart 500 may be carried out by wearable devices described herein to alter a state of modular light assemblies described herein. Further, in some embodiments, the steps shown and described in flowchart 500 are carried out at one or more processors of a wearable device. Also, the accessory device may include any accessory device shown and described herein. For explanatory purposes, flowchart 500 is primarily described herein with reference to the wearable devices described herein. However, flowchart 500 is not limited to a wearable device or any one component thereof, and one or more blocks (or operations) of flowchart 500 may be performed by different components of the wearable device and/or one or more other devices. Further for explanatory purposes, the blocks of flowchart 500 are described herein as occurring in serial, or linearly. However, multiple blocks of flowchart 500 may occur in parallel. In addition, the blocks of flowchart 500 need not be performed in the order shown, and/or one or more blocks of flowchart 500 need not be performed and/or can be replaced by other operations.

At step 502, an input is received. The wearable device may include a display and/or one or more input mechanisms used to generate an input. Further, the wearable device includes one or more processors designed to receive and process the input.

At step 504, a signal to a communication component of the wearable device is provided based on the received input. In some embodiments, the communication component is a transmitter coil that generates an alternating electromagnetic field, based on an alternating electrical current received at the transmitter coil, that induces electrical current in a receiver coil of the accessory device. Alternatively, in some embodiments, the communication component is a wireless transceiver capable of communication over a short-range communication protocol, such as BLUETOOTH®, as a non-limiting example.

At step 506, a command to the accessory device is generated by the communication component of the wearable device. The command may be generated by an induced electrical current in the receiver coil, caused by the alternating electromagnetic field. Alternatively, the command may be generated by the wireless transceiver, and received by a wireless transceiver of the accessory device.

At step 508, a state of the accessory device is altered based on the command. For example, the command may cause the accessory device to alter a state of one or more light sources of the accessory device from an unilluminated state (i.e., off) to an illuminated state (i.e., on), or vice versa. Further, when the light source is illuminated, the command may be used to alter the light intensity, i.e., increase the light intensity or decrease the light intensity. As a result, the brightness of the light source can be controlled by the wearable device. Lastly, in some embodiments, the command will cause one or more light sources to enter an unilluminated state or an illuminated state.

Accordingly, embodiments of the present disclosure provide a modular light assembly forms a dedicated light source for wearable devices. The modular light assembly may include an onboard input (i.e., button) to control the state of the light sources of the modular light assembly. Additionally, the light sources can be controlled by an input to a wearable device when the modular light assembly is secured with a wearable device. Also, the modular light assembly is liquid-resistant, thus allowing a user to expose a wearable device to liquid (i.e., water) without damaging the modular light assembly.

Various examples of aspects of the disclosure are described below as clauses for convenience. These are provided as examples, and do not limit the subject technology.

Clause A: A wearable device including: a device housing; a touchscreen carried by the device housing; a band configured to secure the device housing to a user, the band connected to the device housing; and a modular light assembly positioned between the band and the device housing, the modular light assembly comprising a light source, wherein: the modular light assembly is separable from the band, and an input to the touchscreen alters a state of the light source.

Clause B: A modular light assembly suitable for use with a wearable device, the modular light assembly including: a housing assembly that includes an internal chamber; a connection mechanism extending from the housing assembly, the connection mechanism including an opening configured to receive a band used with the wearable device; a light source located in the internal chamber; and a communication component configured to receive a command from the wearable device that alters a state of the light source.

Clause C: A modular light assembly suitable for use with a wearable device, the modular light assembly including: a housing assembly that includes an internal chamber, the housing assembly comprising a connection mechanism; a band detachably secured with the housing assembly at the connection mechanism; a light source located in the internal chamber; and a communication component configured to receive a command from the wearable device that alters a state of the light source.

One or more of the above clauses can include one or more of the features described below. It is noted that any of the following clauses may be combined in any combination with each other, and placed into a respective independent clause, e.g., clause A, B, or C.

Clause 1: wherein: the modular light assembly includes a housing assembly that includes an internal chamber; and the light source located in the internal chamber.

Clause 2: wherein the housing assembly further includes: a first end; a second end opposite the first end; a lens secured with the housing assembly at the first end, the lens covering the light source; and a button secured with the housing assembly at the second end, the button configured to control the light source.

Clause 3: further including a link positioned between, and connected with, the device housing and the housing assembly.

Clause 4: further including: a transmitter coil carried by the device housing; and a receiver coil carried by the link, wherein the transmitter coil is configured to provide a command to the receiver coil by an induced electrical current, and the command controls the light source.

Clause 5: wherein the command is generated based on a touch input to the touchscreen.

Clause 6: further including: a link coupled with the housing assembly; and a flexible circuit configured to transmit the command when the link is coupled with the wearable device.

Clause 7: wherein the communication component includes a receiver coil carried by the link, the receiver coil configured to receive an induced electrical circuit that transmits the command.

Clause 8: wherein: the link includes a non-metal insert configured to engage the wearable device, and the receiver coil is disposed in the non-metal insert.

Clause 9: wherein: the housing assembly includes a cylindrical body, and the connection mechanism and the link extend radially outward from the cylindrical body.

Clause 10: further including a second flexible circuit that passes through the housing assembly and electrically couples to the communication component.

Clause 11: wherein the housing assembly further includes: a first end; a second end opposite the first end; a lens secured with the housing assembly at the first end, the lens covering the light source; and a button secured with the housing assembly at the second end, the button electrically coupled to the flexible circuit and configured to control the light source.

Clause 12: further including a power source located in the internal chamber.

Clause 13: wherein: the connection mechanism includes a receptacle formed in the housing assembly, the band includes a first end detachably secured with the receptacle, and the band includes a second end, opposite the first end, configured to detachably secure with the wearable device.

Clause 14: further including a second connection mechanism secured with the housing assembly, the second connection mechanism configured to secure with a device housing of the wearable device.

Clause 15: wherein the connection mechanism includes an opening, and the band passes through the opening.

Clause 16: further including a second connection mechanism secured with the housing assembly, wherein the second connection mechanism and the band are configured to secure with a device housing of the wearable device.

Clause 17: wherein the communication component includes a wireless transceiver configured to communicate with the wearable device over a short-range wireless communication protocol.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A wearable device comprising:
    a device housing;
    a touchscreen carried by the device housing;
    a band configured to secure the device housing to a user, the band connected to the device housing; and
    a an accessory device positioned between, and coupled with, the band and the device housing, the accessory device comprising:
        a housing assembly; and
        a light source disposed in the housing assembly, wherein:
            the accessory device is separable from the band, and
            an input to the touchscreen alters a state of the light source.

2. The wearable device of claim 1, wherein:
    the housing assembly that includes an internal chamber; and
    the light source located in the internal chamber.

3. The wearable device of claim 2, wherein the housing assembly further comprises:
    a cylindrical body that defines a first end and a second end opposite the first end;

a lens secured with the first end, the lens covering the light source; and
a button secured with the second end, the button configured to illuminate the light source.

4. The wearable device of claim 2, further comprising a link positioned between, and connected with, the device housing and the housing assembly.

5. The wearable device of claim 4, further comprising:
a transmitter coil carried by the device housing; and
a receiver coil carried by the link, wherein the transmitter coil is configured to provide a command to the receiver coil by an induced electrical current, and the command controls the light source.

6. The wearable device of claim 1, wherein:
the device housing comprises a receptacle configured to receive the accessory device, and
the accessory device is separable from the device housing at the receptacle.

7. An accessory device suitable for use with a wearable device, the accessory device comprising:
a housing assembly comprising a cylindrical body that defines an internal chamber;
a connection mechanism extending from the cylindrical body, the connection mechanism comprising an opening configured to receive a band used with the wearable device;
a light source located in the internal chamber;
a lens coupled with the housing assembly and covering the light source; and
a communication component, wherein the light source is configured to receive a command, via the communication component, that alters a state of the light source.

8. The accessory device of claim 7, further comprising:
a link coupled with the housing assembly; and
a flexible circuit configured to transmit the command when the link is coupled with the wearable device.

9. The accessory device of claim 8, wherein the communication component comprises a receiver coil carried by the link, the receiver coil configured to receive an induced electrical circuit that transmits command.

10. The accessory device of claim 9, wherein:
the link comprises a non-metal insert configured to engage the wearable device, and
the receiver coil is disposed in the non-metal insert.

11. The accessory device of claim 8, wherein:
the housing assembly comprises a cylindrical body, and the connection mechanism and the link extend radially outward from the cylindrical body.

12. The accessory device of claim 11, further comprising a second flexible circuit that passes through the housing assembly and electrically couples to the communication component.

13. The accessory device of claim 8, wherein:
the housing assembly further comprises a first end and a second end opposite the first end,
a lens is secured with the housing assembly at the first end
a button is secured with the housing assembly at the second end, the button electrically coupled to the flexible circuit and configured to control the light source, and
the internal chamber is covered by the lens and the button.

14. The accessory device of claim 7, further comprising a power source located in the internal chamber.

15. An accessory device suitable for use with a wearable device, the accessory device comprising:
a housing assembly that includes an internal chamber, the housing assembly comprising connection mechanism;
a band detachably secured with the housing assembly at the connection mechanism;
a light source located in the internal chamber;
a button coupled with a first end of the housing assembly and configured to alter a state of the light source; and
a lens coupled with a second end of the housing assembly and covering the light source, the second end opposite the first end.

16. The accessory device of claim 15, wherein:
the connection mechanism comprises a receptacle formed in the housing assembly,
the band comprises a first end detachably secured with the receptacle, and
the band comprises a second end, opposite the first end, configured to detachably secure with the wearable device.

17. The accessory device of claim 16, further comprising a second connection mechanism secured with the housing assembly, the second connection mechanism configured to secure with a device housing of the wearable device.

18. The accessory device of claim 15, wherein the connection mechanism comprises an opening, and the band passes through the opening.

19. The accessory device of claim 18, further comprising a second connection mechanism secured with the housing assembly, wherein the second connection mechanism and the band are configured to secure with a device housing of the wearable device.

20. The accessory device of claim 15, further comprising a communication component configured to receive a command from the wearable device that alters a state the light source, wherein the communication component comprises a wireless transceiver configured to communicate with the wearable device over a short-range wireless communication protocol.

* * * * *

UNITED STATES PATENT AND TRADEMARK OFFICE
CERTIFICATE OF CORRECTION

| | |
|---|---|
| PATENT NO. | : 12,093,088 B2 |
| APPLICATION NO. | : 17/833784 |
| DATED | : September 17, 2024 |
| INVENTOR(S) | : Daniel J. Hiemstra et al. |

It is certified that error appears in the above-identified patent and that said Letters Patent is hereby corrected as shown below:

In the Claims

Column 14, Line 52 (Claim 1): "a an accessory device" should read --an accessory device--.

Signed and Sealed this
Tenth Day of December, 2024

Katherine Kelly Vidal
*Director of the United States Patent and Trademark Office*